US009718980B2

(12) United States Patent
F. Chin et al.

(10) Patent No.: US 9,718,980 B2
(45) Date of Patent: Aug. 1, 2017

(54) COATING COMPOSITION AND COATED PAPER

(71) Applicant: Goldeast Paper (Jiangsu) Co., Ltd, Zhenjiang (CN)

(72) Inventors: Yungchang F. Chin, Zhenjiang (TW); Yan Feng, Zhenjiang (TW)

(73) Assignee: Goldeast Paper (Jiangsu) Co., Ltd, Zhenjiang, Jiangsu Province (CN)

( * ) Notice: Subject to any disclaimer, the term of this patent is extended or adjusted under 35 U.S.C. 154(b) by 1012 days.

(21) Appl. No.: 13/858,049

(22) Filed: Apr. 7, 2013

(65) Prior Publication Data
US 2014/0050922 A1 Feb. 20, 2014

(30) Foreign Application Priority Data

Aug. 14, 2012 (CN) .......................... 2012 1 0288758

(51) Int. Cl.
*C09D 101/02* (2006.01)
*C08K 13/02* (2006.01)
*C09D 103/00* (2006.01)
*D21H 19/36* (2006.01)
*D21H 19/52* (2006.01)

(52) U.S. Cl.
CPC ............ *C09D 101/02* (2013.01); *C08K 13/02* (2013.01); *C09D 103/00* (2013.01); *D21H 19/36* (2013.01); *D21H 19/52* (2013.01); *C08L 2205/16* (2013.01); *Y10T 428/2927* (2015.01)

(58) Field of Classification Search
CPC .... C09D 101/02; C09D 103/00; D21H 19/36; D21H 19/52; Y10T 428/2927
USPC ............................................ 428/372; 524/35
See application file for complete search history.

(56) References Cited

U.S. PATENT DOCUMENTS

| | | | |
|---|---|---|---|
| 4,483,743 A | 11/1984 | Turbak et al. | |
| 4,952,278 A | 8/1990 | Gregory et al. | |
| 5,147,507 A | 9/1992 | Gill | |
| 5,414,079 A | 5/1995 | Banker et al. | |
| 5,914,003 A | 6/1999 | Kosowski et al. | |
| 6,103,790 A | 8/2000 | Cavaille et al. | |
| 6,379,494 B1 | 4/2002 | Jewell et al. | |
| 6,514,384 B1 | 2/2003 | Jewell et al. | |
| 6,524,348 B1 | 2/2003 | Jewell et al. | |
| 6,698,880 B1 | 3/2004 | Campbell et al. | |
| 6,703,497 B1 | 3/2004 | Ladouce et al. | |
| 6,749,721 B2 | 6/2004 | Shannon | |
| 6,824,645 B2 | 11/2004 | Jaschinski et al. | |
| 7,001,483 B2 | 2/2006 | Severeid et al. | |
| 7,378,149 B2 | 5/2008 | Yano et al. | |
| 7,455,901 B2 | 11/2008 | Yano et al. | |
| 7,625,962 B2 | 12/2009 | Laleg | |
| 7,927,675 B2 | 4/2011 | Beer et al. | |
| 8,012,312 B2 | 9/2011 | Goto et al. | |
| 8,053,043 B2 | 11/2011 | Beer et al. | |
| 8,231,764 B2 | 7/2012 | Husband et al. | |
| 8,747,612 B2 | 6/2014 | Heiskanen et al. | |
| 8,778,134 B2 | 7/2014 | Vehvilainen et al. | |
| 8,871,057 B2 | 10/2014 | Gane et al. | |
| 8,911,591 B2 | 12/2014 | Ankerfors et al. | |
| 8,980,059 B2 | 3/2015 | Jogikalmath et al. | |
| 8,992,728 B2 | 3/2015 | Isogai et al. | |
| 2003/0094252 A1 | 5/2003 | Sundar et al. | |
| 2005/0053735 A1 | 3/2005 | Beer et al. | |
| 2008/0193668 A1 | 8/2008 | Mevellec et al. | |
| 2010/0065236 A1 | 3/2010 | Henriksson et al. | |
| 2010/0233481 A1 | 9/2010 | Isogai et al. | |
| 2011/0008638 A1 | 1/2011 | Miyawaki et al. | |
| 2011/0259537 A1 | 10/2011 | Husband | |
| 2011/0277947 A1 | 11/2011 | Hua et al. | |
| 2012/0043039 A1 | 2/2012 | Paltakari et al. | |
| 2012/0080156 A1 | 4/2012 | Laleg | |
| 2012/0132381 A1 | 5/2012 | Hentze et al. | |
| 2012/0160441 A1* | 6/2012 | Oksanen ................ | D21H 19/36 162/204 |
| 2012/0237750 A1 | 9/2012 | Zou et al. | |
| 2013/0000856 A1 | 1/2013 | Kajanto et al. | |
| 2013/0017394 A1 | 1/2013 | Hua et al. | |
| 2013/0047893 A1 | 2/2013 | Heiskanen | |
| 2013/0053454 A1 | 2/2013 | Heiskanen et al. | |
| 2013/0180680 A1 | 7/2013 | Axrup et al. | |
| 2013/0199745 A1 | 8/2013 | Virtanen et al. | |
| 2013/0225732 A1 | 8/2013 | Bakeev | |
| 2013/0274149 A1 | 10/2013 | Lafitte et al. | |
| 2015/0125829 A1 | 5/2015 | Hyman | |

FOREIGN PATENT DOCUMENTS

| | | |
|---|---|---|
| CN | 1142238 A | 2/1997 |
| CN | 101952508 A | 1/2011 |

(Continued)

OTHER PUBLICATIONS

Lavoine, N. et al. (2012) "Microfibrillated cellulose-Its barrier properties and applications in cellulosic materials: A review." Carbohydrate Polymers, 90: 735-764. This reference was previously submitted, Jul. 2015, but with an incorrect author's name Henrikki Liimatainena et al. and a reference from a different volume of the same journal. The same PDF is resubmitted for clarity, and the PDF for the Henrikki Liimatainena et al. is also being submitted below for completeness.).

(Continued)

*Primary Examiner* — Vincent A Tatesure
(74) *Attorney, Agent, or Firm* — Jeffrey Dean Lindsay

(57) ABSTRACT

A coating composition for forming a paper coat includes nano-fibrillated cellulose, pigment, latex, an auxiliary additive, and water. On a dry weight basis, the nano-fibrillated cellulose is in an amount by weight of 0.02 parts to 10 parts in the total composition, the pigment is in an amount by weight of 75 parts to 95 parts in the total composition, the latex is in an amount by weight of 5 parts to 15 parts in the total composition, and the auxiliary additive is in an amount by weight of 0.35 parts to 10 parts in the total composition.

17 Claims, No Drawings

(56) References Cited

FOREIGN PATENT DOCUMENTS

| CN | 102587193 A | 7/2012 |
|---|---|---|
| EP | 0748348 B1 | 9/1997 |
| EP | 1215217 A1 | 6/2002 |
| JP | 2000303386 A | 10/2000 |
| WO | WO8905833 A1 | 6/1989 |
| WO | WO9507303 A1 | 3/1995 |
| WO | WO2008112477 A1 | 9/2008 |
| WO | WO2010125247 A2 | 4/2010 |
| WO | WO2010124378 A1 | 11/2010 |
| WO | WO2010142846 A1 | 12/2010 |
| WO | WO2011055017 A1 | 5/2011 |
| WO | WO 2011/141876 A1 | 11/2011 |
| WO | WO 2011/141877 A1 | 11/2011 |
| WO | WO2013121104 A2 | 8/2013 |
| WO | WO 2013/156223 A1 | 10/2013 |
| WO | WO2014001628 A1 | 1/2014 |
| WO | WO2014140275 A1 | 9/2014 |
| WO | WO2014147293 A1 | 9/2014 |

OTHER PUBLICATIONS

Henrikki Liimatainena et al., "Fabrication of cationic cellulosic nanofibrils through aqueous quaternization pretreatment and their use in colloid aggregation," Carbohydrate Polymers, vol. 103, Mar. 15, 2014, pp. 187-192, abstract.

* cited by examiner

COATING COMPOSITION AND COATED PAPER

CLAIM OF PRIORITY

This application claims the benefit of priority to People's Republic of China Patent Application No. 201210288758.0, Ser. No. 2012081500481420, filed Aug. 14, 2012, which is hereby incorporated by reference herein in its entirety.

BACKGROUND

1. Technical Field

The present disclosure relates to a coating composition in the field of papermaking and a coated paper applied with the coating composition.

2. Description of Related Art

In the field of papermaking, coatings are commonly applied to one or both surfaces of paper sheet. Many printed paper materials, for example, rely on coatings to provide a suitable surface and background for the printed ink. However, coatings on paper may lack sufficient strength, flexibility, or other useful properties. Limitations of prior technology may include, for example, either or both of the following: (1) the inability to apply a heavy coat to paper without high risk of the coat cracking or otherwise failing in use; and (2) mechanical failure of the coat such as spallation, blistering, tearing, peeling away from the substrate in printing, etc., due to inadequate tensile strength or other strength properties of the coating.

Therefore, there is room for improvement within the art.

DETAILED DESCRIPTION

Cellulose is an organic compound with the formula $(C_6H_{10}O_5)_n$, a polysaccharide consisting of a linear chain of several hundred to over ten thousand β-1,4 linked D-glucose units. Nano-fibrillated cellulose (NFC) is nanoscale cellulose microfibrils defibrated from cellulosic materials. The NFC microfibrils have dimensions of about 100 nm to about 2000 nm in length, and about 3 nm to about 200 nm in diameter. The NFC typically has a property that if it is mixed with water to obtain an aqueous dispersion with the NFC having a weight percentage of 1%, the aqueous dispersion at room temperature has a viscosity of 50 cps to 300 cps.

NFC may also be known as nanocellulose, nanofibrillar cellulose, microfibrillar cellulose, cellulose nanofiber (CNF), or microfibrillated cellulose (MFC).

The NFC may be prepared by a TEMPO catalytic oxidation method, a biological enzyme method, a mechanical homogenization method, a ball milling method, or a high-pressure homogenization method. In the preparing process, some hydroxyl groups (—OH) on the chain of glucose of the NFC compound are selectively oxidized to carboxyl groups (—COOH) and aldehyde groups (—CHO). The NFC has a high aspect ratio and small dimensions, and has hydroxyl groups, carboxyl groups, and aldehyde groups. Thus, NFC has good compatibility with various aqueous coating compositions, and can be dispersed in an aqueous coating composition stably and prevent or inhibit flocculation of the coating composition particles. In addition, NFC can help the coating composition to display good film-forming properties.

One example for preparing NFC by the tempo catalytic oxidation method may include the following steps: (1) providing bleached kraft pulp (BKP) and beating the pulp until the freeness (Canadian Standard Freeness) of the pulp is less than 200 ml; (2) adding sodium hydroxide solution (4 wt %) to 6 g of the beaten pulp until the pH value of the slurry reaches 9, and then adding 10 mg TEMPO ((2,2,6,6-Tetramethylpiperidin-1-yl)oxyl) free radical solution (0.1 wt %) and 100 mg catalyst of sodium bromide solution (1 wt %); (3) adding 90 ml sodium hypochlorite solution (10 wt %) to the above pulp and stirring; (4) adding sodium hydroxide solution (4 wt %) again to the pulp until the pH value of the stuff reaches 10 to 10.5, and maintaining stirring for about 5 hours; (5) adding ethanol, and then adding hydrochloric acid solution (4 wt %) to the pulp until the pH value reaches 7 and a fiber suspension is made; (6) removing the inorganic salt in the fiber suspension by centrifugal washing; and (7) ultrasonically treating the above fiber suspension using a frequency of 20 kHz and power of 25 W for 35 minutes, at which time a translucent or transparent NFC aqueous dispersion is made.

A coating composition contains NFC, pigment, latex, auxiliary additive, and water; wherein on a dry weight basis, the NFC is in an amount by weight of 0.02 parts to 10 parts in the total composition, the pigment is in an amount by weight of 75 parts to 95 parts in the total composition, the latex is in an amount by weight of 5 parts to 15 parts in the total composition, and the auxiliary additive is in an amount by weight of 0.35 parts to 10 parts in the total composition. Optionally, the coating composition may further contain alkali, giving the coating composition a pH value of 8 to 10.5. The alkali in the coating composition can be sodium hydroxide or potassium hydroxide, but is not limited the two above-mentioned alkalis.

The pigment is selected from the group consisting of ground calcium carbonate (GCC), precipitated calcium carbonate (PCC), kaolin, talc, and any combination thereof. In one embodiment, at least 65% of the pigment by weight has a particle size of less than 2 μm. More specifically, at least 95% of the pigment by weight has a particle size of less than 2 μm.

The latex can be usual latex for paper coating, such as any one or more of styrene butadiene latex, propyl benzene latex, methyl methacrylate styrene butadiene latex, styrene acrylic resin, acrylic emulsion, and polyurethane emulsion.

The auxiliary additive can be any known auxiliary additive for paper coating. Generally the auxiliary additive is selected from the group consisting of starch, water proofing agents, lubricants, defoamers, dispersants, rheology modifiers, fluorescent whitening agents, dyes, and any combination thereof. For example, the auxiliary additive may contain starch in an amount by weight of 0 parts to 7 parts, water proofing agent in an amount by weight of 0.15 parts to 1 part, lubricant in an amount by weight of 0.25 parts to 1 part, defoamer in an amount by weight of 0.05 parts to 0.5 parts, dispersants in an amount by weight of 0.05 parts to 0.5 parts, rheology modifier in an amount by weight of 0 parts to 1 part, fluorescent whitening agent in an amount by weight of 0 parts to 3 parts, and dye in an amount by weight of 0 parts to 1.5 parts.

The coating composition is prepared by mixing NFC, pigment, latex, alkali, auxiliary additive and water together. The coating composition generally contains solids in an amount of 25% to 75% by weight. The coating composition may have a pH value of 8 to 10.5.

The coating composition may also be prepared by adding the above-mentioned raw materials of the coating composition in a certain order. One such example for making the coating composition includes the following steps: (1) mixing pigment in an amount by weight of 75 parts to 95 parts and some water together; (2) adding alkali in an amount by weight of 0.1 parts to 1 part, to make the pH value of the mixing system from 8.5 to 10; (3) adding auxiliary additive in an amount by weight of 0.35 parts to 10 parts; (4) adding latex in an amount by weight of 5 parts to 15 parts; (5) adding NFC in an amount by weight of 0.02 parts to 10 parts; and (6) adding water if necessary to adjust the mixing system's solids content; and thus the coating composition is made.

Benefits of adding the NFC in the coating composition may include one or more of the following: (1) the NFC has a high aspect ratio and good flexibility, which can effectively improve the fracture resistance of the coating composition and provide capability to apply heavy coats to paper without high risk of the coat cracking; (2) the small amount of the NFC can change the viscosity and high-shear viscosity of the coating composition, and the NFC can act as a rheology modifier and film-forming auxiliary of the coating composition; (3) the carboxyl groups and the aldehyde groups of the NFC can crosslink with functional groups of the components in the coating composition, and improve the quality of the coated paper; (4) the NFC can substitute a portion of the latex required in the coating composition; and (5) the negatively charged NFC can attract some of the positively charged particles in the coating composition, which can improve the dispersion of the coating composition particles.

A coated paper applied with the above-mentioned coating composition includes a paper substrate and at least one coat formed on one or both surfaces of the paper substrate. The coat formed on one surface of the paper substrate can be a monolayer or a stacked multilayer. The coating composition containing NFC applied on the surface of the paper substrate can effectively improve the fracture resistance of the paper, and can reduce the risk of heavy coat cracking and mechanical failure of the coat such as spallation, blistering, tearing, and peeling away from the paper substrate. Furthermore, the coating composition containing NFC can also reduce the roughness of the coated paper and make the surface of the coated paper much smoother. Therefore, the coated paper applied with the coating composition containing NFC can be used as high-grade printing paper, wrapping paper for foods or cosmetics, etc.

EXAMPLE 1

In this embodiment, the coated paper included a paper substrate, a base coat formed on one surface of the paper substrate, and a top coat formed on the surface of the base coat. Both the base coat and top coat contained NFC.

GCC, sodium hydroxide solution, latex, NFC, starch, dispersants, lubricant, defoamer, water proofing agent, and water were mixed together and dispersed at a high speed for about 20 min. to make a first coating composition for the base coat. The weight ratio of GCC, latex, NFC, starch, dispersants, lubricant, defoamer, and water proofing agent was, respectively, 75:7.5:0.1:7:0.05:0.05:0.1:0.4. The sodium hydroxide solution brought the pH value of the first coating composition to 9.5. The first coating composition contained 64% by weight solids.

GCC, kaolin, sodium hydroxide solution, latex, NFC, dispersants, lubricant, defoamer, water proofing agent, and water were mixed together and dispersed at a high speed for about 20 min. to make a second coating composition for the top coat. The weight ratio of GCC, kaolin, latex, NFC, dispersants, lubricant, defoamer, and water proofing agent, respectively, was 85:5:10:0.02:0.2:1:0.05:1. The sodium hydroxide solution made the pH value of the second coating composition about 9. The second coating composition contained about 75% by weight solids.

A paper substrate without any coat having a basis of 69 g/m² was provided. The first coating composition was coated on one surface of the paper substrate to form the base coat, then the second coating composition was coated on the surface of the base coat to form the top coat, and finally the paper was calendared to form the coated paper. The coat weight of the first coating composition was 13 g/m². The coat weight of the second coating composition was 12 g/m².

COMPARATIVE EXAMPLE 1

A comparative first coating composition, a comparative second coating composition and a comparative coated paper were made according to the method, weight ratio of raw materials, and technical parameters in Example 1 above, but the comparative first coating composition and the comparative second coating composition did not contain NFC.

The coating compositions and the coated papers in Example 1 and Comparative Example 1 were tested for performance. The test results are listed in Table 1 below.

TABLE 1

| Test type | Comparative Example 1 | Example 1 |
|---|---|---|
| Static viscosity of the first coating composition cps | 1082 | 1432 |
| Static viscosity of the second coating composition cps | 1782 | 2089 |
| High-shear viscosity of the first coating composition cps | 22.4 | 24.7 |
| High-shear viscosity of the second coating composition cps | 34.4 | 36.8 |
| Basis weight g/m² | 93.6 | 94.3 |
| Thickness μm | 84.4 | 84.6 |
| Roughness μm | 1.02 | 0.94 |
| Smoothness s | 630 | 723 |
| Air permeability s | 4789 | 4828 |
| Fold endurance test, number of folds (1.5 kg) | 21 | 29 |
| Folding damage level | 4 | 3 |
| Glossiness % | 68.7 | 70.1 |
| Glossiness after printing % | 77.2 | 81.5 |

Remarks: folding damage level is a measurement used to assess the quality of coated paper by folding the coated paper. The coating at the folded position may have damage such as fracturing, release of dust and dropped fragments. Ten levels from level one to level ten indicating the extent of the coat's damage are used to represent the quality levels of the coated paper. Level one and level ten represent the best quality of coated paper and the worst quality of coated paper, respectively.

The test results from Table 1 demonstrate that the coated paper in Example 1 has better mechanical properties than the coated paper in Comparative Example 1.

EXAMPLE 2

In this embodiment, the coated paper included a paper substrate, a base coat formed on one surface of the paper substrate, and a top coat formed on the surface of the base coat. The base coat contained NFC, but the top coat did not contain NFC.

GCC, sodium hydroxide solution, latex, NFC, dispersants, lubricant, defoamer, water proofing agent, and water were mixed together and dispersed at a high speed for about 20 min. to make a first coating composition for the base coat. The weight ratio of GCC, latex, NFC, dispersants, lubricant, defoamer, and water proofing agent, respectively, was 75:10.5:0.2:0.05:0.05:0.1:0.4. The sodium hydroxide solution brought the pH value of the first coating composition to 9.5. The first coating composition contained 64% by weight solids.

GCC, PCC, sodium hydroxide solution, latex, dispersants, lubricant, defoamer, water proofing agent, and water were mixed together and dispersed at a high speed for about 20 min. to make a second coating composition for the top coat. The weight ratio of GCC, PCC, latex, dispersants, lubricant, defoamer, and water proofing agent was, respectively, 85:5:11:0.05:0.6:0.05:0.6. The sodium hydroxide solution brought the pH value of the second coating composition to 9.5. The second coating composition contained 67% by weight solids.

A paper substrate without any coat having a gram weight of about 105 g/m² was provided. The first coating composition was coated on one surface of the paper substrate to form the base coat, then the second coating composition was coated on the surface of the base coat to form the top coat, and finally the paper was calendared to form the coated paper. The coat weight of the first coating composition was 13 g/m². The coat weight of the second coating composition was 12 g/m².

COMPARATIVE EXAMPLE 2

A comparative first coating composition, a comparative second coating composition and a comparative coated paper were made according to the method, weight ratio of raw materials, and technical parameters in Example 2, but the comparative first coating composition did not contain NFC.

The coating compositions and the coated papers in Example 2 and Comparative Example 2 were tested for performance. The test results are listed in Table 2.

TABLE 2

| Test type | Comparative Example 2 | Example 2 |
| --- | --- | --- |
| Static viscosity of the first coating composition cps | 1082 | 1082 |
| Static viscosity of the second coating composition cps | 1349 | 1564 |
| High-shear viscosity of the first coating composition cps | 22.4 | 22.4 |
| High-shear viscosity of the second coating composition cps | 24.5 | 26.9 |
| Basis weight g/m² | 131.6 | 132.1 |
| Thickness μm | 134.8 | 133.9 |
| Roughness μm | 0.91 | 0.81 |
| Smoothness s | 186 | 183 |
| Air permeability s | 2198 | 2210 |
| Fold endurance test, number of folds (1.5 kg) | 13 | 23 |
| Folding damage level | 3 | 2 |
| Glossiness % | 61.8 | 62.5 |
| Glossiness after printing % | 81.9 | 82.7 |

The test results from Table 2 demonstrate that the coated paper in Example 2 has better mechanical properties than the coated paper in Comparative Example 2.

EXAMPLE 3

In this embodiment, the coated paper included a paper substrate and a coat formed on one surface of the paper substrate. The coat contained NFC.

GCC, sodium hydroxide solution, latex, NFC, dispersants, lubricant, defoamer, water proofing agent, and water were mixed together and dispersed at a high speed for about 20 min to make a coating composition for the coat. The weight ratio of GCC, latex, NFC, dispersants, lubricant, defoamer, and water proofing agent, respectively, was 95:5:10:0.05:0.6:0.05:0.3. The sodium hydroxide solution brought the pH value of the first coating composition to 9. The first coating composition contained 25% by weight solids.

A paper substrate without any coating and having a basis weight of about 50 g/m² was provided. The coating composition was coated on one surface of the paper substrate to form the coat, and then the paper was calendared to form the coated paper. The coat weight of the coating composition was 4 g/m².

COMPARATIVE EXAMPLE 3

A comparative coating composition and a comparative coated paper were made according to the method, weight ratio of raw materials, and technical parameters in Example 3, but the comparative coating composition did not contain NFC.

TABLE 3

| Test type | Comparative Example 3 | Example 3 |
| --- | --- | --- |
| High-shear viscosity of the coating composition cps | 20.9 | 50.4 |
| Basis weight g/m² | 55.0 | 54.2 |
| Thickness μm | 73.1 | 72.5 |
| Roughness μm | 6.37 | 6.09 |
| Smoothness s | 23 | 27 |
| Air permeability s | 142.7 | 137.7 |
| Fold endurance test, number of folds (1.5 kg) | 9 | 15 |
| Folding damage level | 1 | 1 |
| Glossiness % | 5.1 | 5.8 |

The coating compositions and the coated papers in Example 3 and Comparative Example 3 were tested for performance. The test results are listed in Table 3.

The test results from Table 3 demonstrate that the coated paper in Example 3 has better mechanical properties than the coated paper in Comparative Example 3.

It is believed that the exemplary embodiments and their advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

The invention claimed is:

1. A coating composition for forming a paper coat, comprising: a mixture of nano-fibrillated cellulose, pigment, latex, an auxiliary additive, and water, wherein on a dry weight basis, the nano-fibrillated cellulose is in an amount by weight of 0.02 parts to 10 parts in the total composition, the pigment is in an amount by weight of 75 parts to 95 parts in the total composition, the latex is in an amount by weight of 5 parts to 15 parts in the total composition, and the auxiliary additive is in an amount by weight of 0.35 parts to 10 parts in the total composition, wherein the nano-fibrillated cellulose comprises nanoscale cellulose microfibrils having dimensions of 100 nm to 2000 nm in length, and 3 nm to 200 nm in diameter.

2. The coating composition as claimed in claim 1, wherein the nano-fibrillated cellulose has hydroxyl groups, carboxyl groups and aldehyde groups.

3. The coating composition as claimed in claim 1, wherein the nano-fibrillated cellulose prior to combination with the pigment has a property that if the nano-fibrillated cellulose is mixed with water to obtain an aqueous dispersion with the nano-fibrillated cellulose having a weight percentage of about 1%, the aqueous dispersion has a viscosity in a range from 50 cps to 300 cps.

4. The coating composition as claimed in claim 1, wherein the pigment is selected from the group consisting of ground calcium carbonate, precipitated calcium carbonate, kaolin, talc, and any combination thereof.

5. The coating composition as claimed in claim 1, wherein at least 65% of the pigment by weight has a particle size of less than 2 μm.

6. The coating composition as claimed in claim 1, wherein at least 95% of the pigment by weight has a particle size of less than 2 μm.

7. The coating composition as claimed in claim 1, wherein the auxiliary additive is selected from the group consisting of starch, water proofing agent, lubricant, defoamer, dispersants, rheology modifier, fluorescent whitening agent, dye, and any combination thereof.

8. The coating composition as claimed in claim 7, wherein the auxiliary additive comprises starch, water proofing agent in an amount by weight of 0.15 parts to 1 part, lubricant in an amount by weight of 0.25 parts to 1 part, and dispersants in an amount by weight of 0.05 parts to 0.5 parts, wherein the parts by weight are all relative to the weight of the total composition.

9. The coating composition as claimed in claim 1, wherein the coating composition comprises solids in an amount of 25% to 75% by weight.

10. The coating composition as claimed in claim 1, wherein the latex is selected from the group consisting of styrene butadiene latex, propyl benzene latex, methyl methacrylate styrene butadiene latex, styrene acrylic resin, acrylic emulsion, polyurethane emulsion, and any combination thereof.

11. The coating composition as claimed in claim 1, further comprising alkali, wherein the alkali is configured to make the coating composition have a pH value of 8 to 10.5.

12. The coating composition as claimed in claim 11, wherein the alkali is sodium hydroxide or potassium hydroxide.

13. A coated paper, comprising: a paper substrate and at least one coat formed on at least one of the surfaces of the paper substrate, each of the at least one coat being a monolayer or a stacked multilayer, at least one layer of the at least one coat located on the corresponding one of the at least one surface comprising a coating composition applied on the paper substrate, wherein the coating composition comprises a mixture of nano-fibrillated cellulose, pigment, latex, auxiliary additive, and water, and wherein on a dry weight basis, the nano-fibrillated cellulose is in an amount by weight of 0.02 parts to 10 parts in the total composition, the pigment is in an amount by weight of 75 parts to 95 parts in the total composition, the latex is in an amount by weight of 5 parts to 15 parts in the total composition, and the auxiliary additive is in an amount by weight of 0.35 parts to 10 parts in the total composition, and wherein the nano-fibrillated cellulose comprises nanoscale cellulose microfibrils having dimensions of 100 nm to 2000 nm in length and 3 nm to 200 nm in diameter.

14. The coated paper as claimed in claim 13, wherein the pigment is selected from the group consisting of ground calcium carbonate, precipitated calcium carbonate, kaolin, talc, and any combination thereof.

15. The coated paper as claimed in claim 13, wherein the auxiliary additive is selected from the group consisting of starch, water proofing agent, lubricant, defoamer, dispersants, rheology modifier, fluorescent whitening agent, dye, and any combination thereof.

16. The coated paper as claimed in claim 15, wherein the auxiliary additive comprises starch, water proofing agent in an amount by weight of 0.15 parts to 1 part, lubricant in an amount by weight of 0.25 parts to 1 part, defoamer in an amount by weight of 0.05 parts to 0.5 parts, dispersants in an amount by weight of 0.05 parts to 0.5 parts, and dye in an amount by weight of 0 parts to 1.5 parts.

17. The coated paper as claimed in claim 13, wherein the latex is selected from the group consisting of styrene butadiene latex, propyl benzene latex, methyl methacrylate styrene butadiene latex, styrene acrylic resin, acrylic emulsion, polyurethane emulsion, and any combination thereof.

\* \* \* \* \*